May 24, 1966     M. MIRSKY     3,252,707
FLUID-RETAINING CUP
Filed Aug. 7, 1963     2 Sheets-Sheet 1
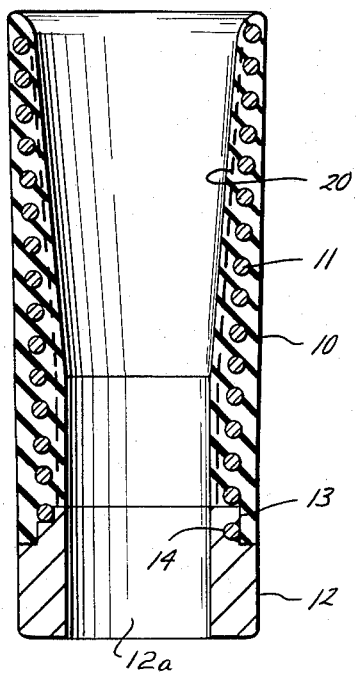
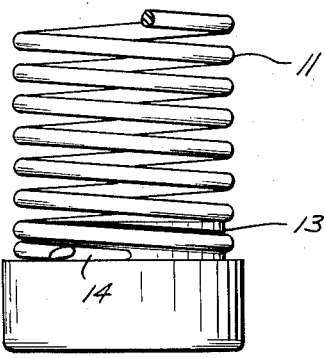
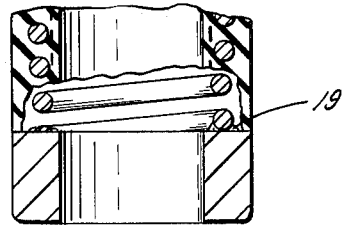
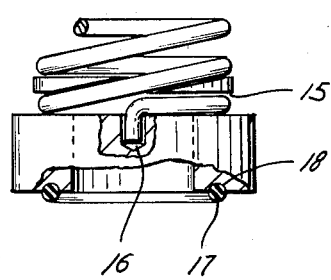
Monroe Mirsky
INVENTOR.
BY *Browning, Simms,*
*Hyer & Eickenroht*
ATTORNEYS May 24, 1966 M. MIRSKY 3,252,707
FLUID-RETAINING CUP
Filed Aug. 7, 1963
2 Sheets-Sheet 2
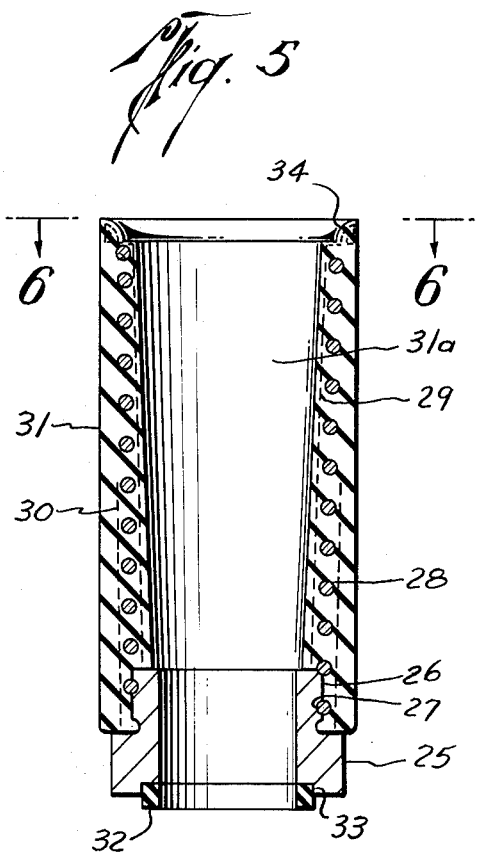
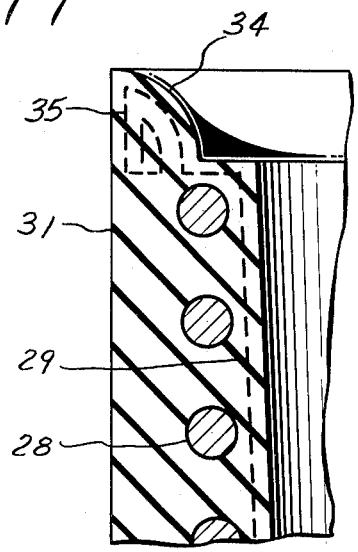
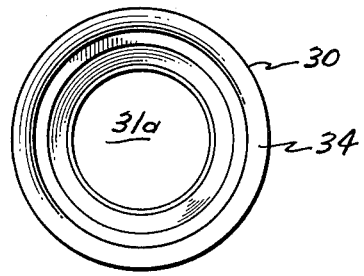
Monroe Mirsky
INVENTOR.
BY Browning, Simms,
Hyer & Eichenroht
ATTORNEYS

United States Patent Office 3,252,707
Patented May 24, 1966

3,252,707
FLUID-RETAINING CUP
Monroe Mirsky, Houston, Tex., assignor to Oteco Equipment Company, Houston, Tex., a corporation of Texas
Filed Aug. 7, 1963, Ser. No. 300,596
4 Claims. (Cl. 277—181)

This application is a continuation-in-part of my previously filed application Serial No. 263,013, filed March 5, 1963, now abandoned.

This invention relates to fluid-retaining cups of the type employed as packing elements on swabs and packers used in oil and gas wells.

The fluid-retaining cups used on swabs and packers in oil and gas wells usually have annular bodies of elastomeric material, normally rubber, which engage the inner walls of the tubing or casing in the well and seal against differential pressures in one direction. In the use of a packer, the cups usually provide a stationary seal whereas when used with a swab they provide a moving seal.

To increase the pressure differential the cups can maintain, the elastomeric material is commonly reinforced with metal wires or fabric or both. Usually, a plurality of metal wires are used, each of which bow or pivot outwardly with the wall of the cup when the cup is under load. Since these reinforcing wires move outwardly with the wall of the cup, they frequently engage the walls of the pipe, and this is undesirable for many reasons. For example, these wires can be detrimental to the wall of the pipe, particularly when the cup is moving relative to the pipe as in the case of a swab cup. This is particularly true if the inside of the pipe is coated with an anti-corrosion material such as a plastic. Also, these wires are frequently left in the well when for various reasons the cup is either torn or worn to the point that one or more of the reinforcing wires are separated from the cup.

It is an object of this invention to provide an improved wire reinforced fluid-retaining cup.

It is a further object of this invention to provide a fluid-retaining cup with wire reinforcing in its walls which does not move outwardly toward the wall of the pipe when the cup is forced into sealing engagement therewith.

It is another object of this invention to provide a fluid-retaining cup which is capable of withstanding high differential pressures.

It is another object of this invention to provide a fluid-retaining cup equipped with wire reinforcing which cannot be lost in the well even though the cup becomes ruptured or torn.

These and other objects, features and advantages of this invention are accomplished by reinforcing the walls of a fluid-retaining cup with a reinforcing wire which spirals around the longitudinal axis of the cup in the manner of a coil spring. Reinforcing so shaped will not move outwardly with the walls of the cup when the cup is subjected to a differential pressure, but instead, it will be compressed longitudinally, under the influence of the compressive force exerted by the pressure, as the elastomeric material of the cup moves outwardly into the sealing engagement with the pipe.

The invention will now be described in connection with the attached drawings, in which FIG. 1 is a longitudinal sectional view of one embodiment of the fluid-retaining cup of this invention in which a coil of reinforcing wire is molded in the annular walls of the cup body;

FIG. 2 shows how the reinforcing wire in FIG. 1 was attached to the base prior to the molding of the elastomeric material around the coil of reinforcing wire;

FIGS. 3 and 4 show alternate methods of attaching the coil of reinforcing wire to the base;

FIG. 5 is a longitudinal sectional view of an alternate embodiment of the invention;

FIG. 6 is a top view of the embodiment shown in FIG. 5; and

FIG. 7 is an enlarged sectional view of the lip provided on the upper end of the embodiment in FIG. 5.

Referring to FIG. 1, the fluid-retaining cup shown comprises annular body 10 of elastomeric material, preferably rubber, either natural or synthetic which is molded around and bonded to a coil or spiral 11 of reinforcing wire. Coil 11 of reinforcing wire is in turn attached to metal base 12 which is also preferably bonded to the lower end of body 10 during the molding process.

The reinforcing wire should be resilient and is preferably a good spring steel. In the embodiment illustrated it extends throughout the length of the annular body as this provides uniform reinforcing throughout the cup. This is desirable when the cup is to be used as a swab cup. Otherwise the unreinforced section of the cup would be forced out against the wall of the pipe first and very likely torn off by the combined action of the pressure and friction between the cup and the pipe. If the cup is to be a packer cup, the upper part of the cup may be left unreinforced if desired and the cup will probably function satisfactorily.

The cup illustrated is designed as a swab cup. Thus base 12 is simply an annular member of rigid material, usually steel, to provide a support for the elastomer material forming the annular body. It is provided with an opening 12a which is in alignment with the opening through body 10 and which allows the cup to be slidably mounted on a swab mandrel. When the cup is to be used on a packer, the base is usually provided with a threaded opening for attaching the cup to the packer body.

FIG. 2 illustrates how the coil of reinforcing wire is attached to the base in the embodiment in FIG. 1. The base is provided with a section of reduced diameter 13 which has a helical groove 14 turned thereon of the same lead angle as the helix angle of the coil of reinforcing wire 11. By placing the end of the wire in the groove and rotating the coil, the wire will follow the groove and screw itself into the position illustrated in FIG. 2. Preferably, the diameter of the helical groove on portion 13 is larger than the inside diameter of the coil so that some force will be required to screw the coil into position. The frictional force thus obtained plus the bond between the wire, the rubber, and the base is usually sufficient to hold the wire in place in the groove. As an added safety feature, the wire may be tack welded to the base if desired.

After being interconnected in this manner, the base and the coil are placed in a mold and the annular body of rubber 11 is molded around the wire and section 13 of the base to produce the cup shown in FIG. 1.

Another method of attaching the coil of reinforcing wire is shown in FIG. 3 where the end loop of the wire is simply placed in a groove 15 provided in the base and its end turned down into a hole 16 to hold the coil against rotation.

FIG. 4 illustrates yet another method of attaching the coil. Here the coil is simply ground flat across its end face and tack welded to the base which in this version is simply provided with a flat face 19.

It should be understood that the coil of reinforcing wire need not be attached to the base, although it is considered the preferable method of manufacturing the cup. For example, in FIG. 4, the spring and body of rubber could be molded together and the cup assembled on the swab or packer mandrel (not shown) with its lower end resting either against a flat supporting surface or in a thimble in the manner well known in the art.

As stated above, the cup shown in FIG. 1 is designed as a swab cup. Thus the lower end of base 12 engages a flat supporting surface (not shown) on the swab mandrel and provides a metal-to-metal seal to hold the fluid in the cup. Many times, however, it is preferred to provide a resilient seal between the base and the swab mandrel. FIG. 3 shows a base with an annular ring 17 of resilient material molded in a groove 18 provided therefor. Ring 17 can be molded simultaneously with the molding of annular body 10 if desired.

The cup in FIG. 1 is shown as having a layer of fabric 20 along the inner surface of the body of rubber. This is additional reinforcing which can be used if desired. The fabric can be cotton duck, fiberglass, nylon, etc.

An alternate embodiment of the invention is shown in FIGS. 5, 6 and 7. This cup is also designed principally for use as a swab cup, having a base 25 like base 12 in the embodiment described above. The base has a portion 26 of reduced diameter, which is provided with a helical groove 27 to allow the helical coil 28 of reinforcing wire to be attached thereto by rotating the coil to force the wire to follow the groove until the end of the wire reaches the end of the groove. In other words, the coil of reinforcing wire is screwed onto base 25 in the same manner as described above in connection with the embodiments shown in FIGS. 1 and 2.

Additional reinforcing is provided by lining the inside of the coil of reinforcing wire with several layers of fabric, generally indicated by the number 29. The outside of the coil adjacent the base is also wrapped with several layers 30 of fabric, to provide additional reinforcing at the lower end of the cup. The amount of fabric reinforcing used will depend on the service to which the cup is to be subjected, etc.

After the reinforcing wire is attached to the base and the fabric reinforcing is in place, the annular body 31 of elastomeric material is molded as shown in FIG. 5 with the reinforcing embedded in its wall. The lower end of the body is also preferably bonded to the base. Opening 31a through the body, preferably, increases in diameter away from the base thus causing the wall thickness of the body to decrease toward the upper end of the cup since in the embodiment shown the outside surface of the cup is cylindrical.

A resilient seal ring 32 is molded in groove 33 provided therefor in the lower end of base 25. This seal ring provides a seal between the lower end of the base and the swab (not shown) in the same manner as seal 17 (FIG. 3) described above.

In this embodiment, the body is extended beyond the end of the coil of reinforcing wire and formed into a lip 34, an enlarged sectional view of which is shown in FIG. 7. This lip, being above the reinforcing wire and being also relatively thin, as compared to the wall to which it is attached, is much more flexible than the rest of the cup and thus can be forced outwardly into sealing engagement with the pipe with less pressure. Lip 34, then, serves to provide the initial seal between the cup and the pipe and maintains the differential pressure across the cup until the pressure within the cup is sufficient to force the walls of the cup below the lip into sealing engagement.

Lip 34 is particularly advantageous when the cup is being used with a swab. There the initial pressure drop across the cup is not great, being determined by the speed that the cup is moved upward. Thus, preferably, a swab cup will seal when subjected to relatively small differential pressures and yet will withstand high differential pressures. This result is obtained in accordance with this invention, by providing a cup having a spiralled reinforcing which allows the cup to withstand large differential pressures, and a relatively flexible lip formed on the upper end of the cup to provide an initial seal under relatively small differential pressures.

The flexibility desired in lip 34 will vary with the service to which the cup is to be subjected. The relative strength of the lip and the walls of the body should not be so disproportionate that the pressure will tear away the lip before causing the walls of the cup to seal. In the embodiment shown in the drawing, lip 34 is substantially reinforced with fabric generally indicated by the number 35.

From the foregoing, it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A fluid-retaining cup comprising a base provided with a spiral groove, an elongated reinforcing wire in engagement with the spiral groove on the base and spiraling outwardly from the base, an annular body of elastomeric material located with one end abutting the base and with the outwardly spiraling wire spiraling around its longitudinal axis and embedded therein.

2. A fluid-retaining cup for sealingly engaging the inner walls of a tubular member, comprising, in combination, an annular body of elastomeric material; a rigid base abutting one end of the annular body; a coil of reinforcing wire attached to the base and spiraling upward therefrom around the longitudinal axis of the body, said portion of the wire above the base being embedded in the body; and a lip of elastomeric material integrally attached to the end of the body opposite the base, said lip being relatively more flexible than the body.

3. A fluid-retaining cup for sealingly engaging the inner walls of a tubular member when subjected to a differential pressure in one direction, comprising, in combination, a cylindrical base having an opening therethrough and a portion of reduced diameter adjacent one end provided with a helical groove; a coil of resilient reinforcing wire with one end in engagement with the groove in the base, extending outwardly from the base, said coil being generally co-axial with the opening through the base; an annular body of elastomeric material molded with the coil above the base embedded in its wall and with its lower end encircling and bonded to the portion of the base of reduced diameter; and an annular lip of elastomeric material of reduced diameter integrally attached to the end of the annular body opposite the base, said lip being relatively more flexible than the annular body to allow the lip to provide the initial seal between the cup and the inner wall of a tubular member when the cup is subjected to a differential pressure such as will cause the lip to move outwardly toward the inner wall of a tubular member.

4. The cup of claim 3 in which the inside diameter of the portion of the coil of reinforcing material in engagement with the groove is less than the minimum diameter of the groove to provide a frictional force between the groove and the wire to resist movement of the wire in the groove.

References Cited by the Examiner

UNITED STATES PATENTS

| | | | |
|---|---|---|---|
| 1,643,119 | 9/1927 | Hartman | 277—235 |
| 2,013,903 | 9/1935 | Thaheld | 277—212 |
| 2,184,634 | 12/1939 | Crickmer | 277—235 X |
| 2,305,282 | 12/1942 | Taylor et al. | 277—235 |
| 2,325,556 | 7/1943 | Taylor et al. | 277—212 |
| 2,390,372 | 12/1945 | Johnston et al. | 277—235 |
| 2,723,721 | 11/1955 | Corsette | 277—212 |
| 2,790,624 | 4/1957 | Lofqvist et al. | 277—235 |
| 3,070,070 | 12/1962 | Trevor | 277—77 |

LAVERNE D. GEIGER, *Primary Examiner.*

EDWARD V. BENHAM, LEWIS J. LENNY, *Examiners.*

L. RANEY, J. MEDNICK, *Assistant Examiners.*